United States Patent Office 3,471,547
Patented Oct. 7, 1969

---

3,471,547
PRODUCTION OF ACRYLONITRILE
Robert J. Evans, Jacksonville, Ill., and Keith M. Taylor, Ballwin, Mo., assignors to Monsanto Company, St. Louis, Mo., a corporation of Delaware
No Drawing. Filed Dec. 27, 1966, Ser. No. 604,552
Int. Cl. C07c 121/02
U.S. Cl. 260—465.9      7 Claims

ABSTRACT OF THE DISCLOSURE

Acrylonitrile is produced by reacting acetonitrile with an aliphatic hydrocarbon in the presence of a promoting agent which is an aldehyde or a ketone. The inclusion of the promoting agent improves the yield of acrylonitrile produced in the reaction of acetonitrile and the aliphatic hydrocarbon.

---

The present invention relates to a process for the production of acrylonitrile. More particularly, the present invention relates to a new and improved non-catalytic process for the direct synthesis of acrylonitrile from acetonitrile and aliphatic hydrocarbons.

Acrylonitrile is among the most valuable monomers available to the polymer industry for producing useful polymeric products. This valuable monomer is used in the preparation of synthetic fibers, synthetic rubbers and for other useful plastic products. Presently, most of the acrylonitrile is produced by such catalytic processes as the catalytic reaction of acetylene and hydrogen cyanide and the reaction of ammonia and propylene. While the known catalytic processes have proven very effective in producing acrylonitrile, the demand for acrylonitrile is so great as to make desirable the development of new and additional processes for producing acrylonitrile. Also, in general, the catalysts most often used in acrylonitrile production are relatively expensive in cost and handling. For these and other reasons, it would be advantageous to have means for producing acrylonitrile without the use of a catalyst.

In copending application Ser. No. 604,626, filed Dec. 27, 1966, a new non-catalytic process for the preparation of acrylonitrile has been disclosed and claimed. The process involves the thermal reaction of acetonitrile and aliphatic hydrocarbon to produce acrylonitrile in relatively good yields. While this process represents a significant advancement in the art of preparing acrylonitrile, it would represent an additional advancement in the art to provide an improvement in the process disclosed and claimed in the copending application.

It is an object of the present invention to provide a new and novel process for the production of acrylonitrile. Another object of the present invention is to provide a new and improved non-catalytic process for the production of acrylonitrile. An additional object of the present invention is to provide a new and improved process for the production of acrylonitrile by the non-catalytic direct reaction of acetonitrile and aliphatic hydrocarbons. A further object of the present invention is to provide a novel improvement in the process of producing acrylonitrile by the non-catalytic reaction of acetonitrile and aliphatic hydrocarbons. It is also an object of the present invention to provide a means whereby the yields of acrylonitrile produced by the non-catalytic reaction of acetonitrile and aliphatic hydrocarbons may be substantially increased. Additional objects will become apparent from the following description of the invention herein disclosed.

The present invention, which fulfills these and other objects, is a process for the preparation of acrylonitrile which comprises subjecting acetonitrile and an aliphatic hydrocarbon to a temperature within the range of 750 to 1000° C. for a period of 0.1 to 20 seconds in the absence of a catalyst and in the presence of minor amounts of a ketone and/or aldehyde. By this process, significant quantities of acrylonitrile are produced. Further, the acrylonitrile is produced without the aid of a catalyst. Since no catalyst is required, the present process results in a reduction of the expense required for catalyst purchase and handling. Additionally, the process of the present invention provides a significant improvement in acrylonitrile yields over those obtained by the reaction of acetonitrile and an aliphatic hydrocarbon without the use of the herein-defined ketone and aldehyde promoting agents.

In order to further describe as well as to demonstrate the present invention, the following examples are presented. These examples are not to be construed as in any manner limiting the present invention.

EXAMPLE I

A mixture of substantially equimolar quantities of acetonitrile and methane was passed through a reactor tube having a length of 12 inches and an internal diameter of one inch. Acetone as a promoting agent, was introduced into the reactor tube concurrently with the mixture of acetonitrile and methane. The acetone represented 5 weight percent of the acetonitrile-methane mixture. The temperature within the reaction tube was approximately 800° C. and the residence time of the reactants within the reaction zone was 3 seconds. Pressure within the reaction zone was essentially atmospheric pressure. The effluent from the reactor tube was passed through a condenser and a liquid product obtained. This liquid product was found to contain 10% by weight of acrylonitrile with the remainder of the liquid product being primarily unreacted acetonitrile.

EXAMPLE II

Example I was substantially repeated with the exception that ethane was used as the aliphatic hydrocarbon. On analysis, the liquid product of this run was found to contain approximately 14% by weight acrylonitrile, the majority of the remainder of the liquid product being unreacted acetonitrile.

EXAMPLE III

Example I was substantially repeated with the exception that no promoting agent was used and the residence time was 4 seconds. The liquid product was found to contain approximately 1% by weight acrylonitrile, the remainder of the liquid product being primarily unreacted acetonitrile.

EXAMPLE IV

Example I was again substantially repeated with the exception that no promoting agent was used and the temperature was 850° C. The liquid product was found to contain 3% by weight acrylonitrile, the remainder of the liquid product being primarily unreacted acetonitrile.

EXAMPLE V

Example II was substantially repeated with the exception that no promoting agent was used. The liquid product was found to contain 8% by weight acrylonitrile, the remainder of the liquid product being primarily unreacted acetonitrile.

EXAMPLE VI

Example I was again substantially repeated with the exception that no aliphatic hydrocarbon was present, the reactants being only acetonitrile containing 5 weight percent acetone. The liquid product was found to contain 8% by weight acrylonitrile, the remainder of the liquid product being primarily unreacted acetonitrile.

By comparison of the results of Example I and Example II, obtained by the process of the present invention, with those obtained in Examples III, IV, V and VI, not obtained in accordance with the process of the present invention, the advantages and the improvement resulting from the process of the present invention are apparent. For example, the amount of acrylonitrile obtained in Example I represents an increase in acrylonitrile production of approximately 233% over the best of Examples III and IV which are most similar to Example I. Example II, in like manner, represents a substantial increase in acrylonitrile produced over Example V which is most similar to Example II, the increase being 75%.

The efficiency of the present invention is further demonstrated by substitution of such aliphatic hydrocarbons as propane, n-pentane, and hexene-1 and such ketones as methyl ethyl ketone and methyl n-propyl ketone and such aldehydes as acetaldehyde and formaldehyde in Examples I and II above. Such substitution results in improved yields of acrylonitrile.

The ketones and aldehydes employed as promoting agents in the process of the present invention generally are the aliphatic ketones and aldehydes having less than 10 carbon atoms though those having a greater number of carbon atoms may be employed if desired. The criticality of the molecular weight of the ketones and aldehydes is primarily a matter of convenience and practicality. The aliphatic radical of the ketones and aldehydes may be either straight chain or branched chain. As a practical matter, the ketones and aldehydes used as promoting agents in the process of the present invention are those having no greater than 6 carbon atoms per molecule. Included within this preferred group are such compounds as acetone, methyl ethyl ketone, methyl n-propyl ketone, methyl isopropyl ketone, diethyl ketone, hexanone-2, hexanone-3, formaldehyde, acetaldehyde, propionaldehyde, n-butyraldehyde, isobutyraldehyde, n-valeraldehyde, n-caproaldehyde, and the like. In the preferred practice of the process of the present invention, the ketones most often are used in preference to the aldehydes as promoting agents. Among the particularly preferred ketones are acetone, methyl ethyl ketone, methyl n-propyl ketone and methyl isopropyl ketone.

In carrying out the process of the present invention, the promoting agent is generally employed in an amount of 1 to 25 weight percent of the acetonitrile-aliphatic hydrocarbon mixture. The preferred amount of promoting agent for use in the process of the present invention is usually within the range of 2 to 15 weight percent of the acetonitrile-aliphatic hydrocarbon mixture.

The aliphatic hydrocarbons useful in the process of the present invention include both the saturated and unsaturated aliphatic hydrocarbons. These aliphatic hydrocarbons may be straight chain or branched chain. If unsaturated, the aliphatic hydrocarbons may be terminally or internally unsaturated. The molecular weight of the aliphatic hydrocarbons may vary substantially ranging from methane up to aliphatic hydrocarbons having 30 to 40 carbon atoms and higher. Choice of molecular weight of aliphatic hydrocarbon for use in the process of the present invention is primarily a matter of practicality. Among the aliphatic hydrocarbons which may be used in carrying out the process of the present invention are the following non-limiting examples: methane, ethane, propane, propylene, n-butane, n-butenes, isobutane, isobutenes, n-pentane, n-pentenes, n-hexane, n-hexenes, 2-methyl pentane, 3-methyl pentane, 2-methyl pentenes, n-heptane, n-heptenes, methyl heptanes, methyl heptenes, dimethyl heptanes, methyl ethyl heptenes, n-octane, n-octenes, n-nonane, n-nonenes, and the like. As a practical matter, the aliphatic hydrocarbons used in the process of the present invention are the paraffin and olefin hydrocarbons of less than 20 carbon atoms. In the preferred practice of the present invention, the aliphatic hydrocarbons are paraffin hydrocarbons of 1 to 10 carbon atoms and olefin hydrocarbons of 3 to 10 carbon atoms.

The acetonitrile and the aliphatic hydrocarbons most often are introduced into the reaction zone in a molar ratio of acetonitrile to aliphatic hydrocarbon within the range of 10:1 to 1:10. The preferred mol ratio will vary to some extent with the molecular weight of the aliphatic hydrocarbons employed. In a general sense, it may be said that higher ratios of acetonitrile to aliphatic hydrocarbons may be used as the molecular weight of the hydrocarbon increases. This results from the fact that at the temperatures at which the process is carried out, some cracking of the aliphatic hydrocarbons will usually take place. Therefore, with higher molecular weight aliphatic hydrocarbons, the cracking of one mol of such hydrocarbon may result in the formation of two or more mols of lower molecular weight aliphatic hydrocarbons available for reaction with the acetonitrile to form acrylonitrile. With the preferred aliphatic hydrocarbons, hereinabove defined, acetonitrile to aliphatic hydrocarbon mol ratios within the range of 6:1 to 1:6 are usually employed in the practice of the present invention.

The temperatures at which the process of the present invention is operated, generally, are within the range of 750 to 1000° C. At temperatures below 750° C., reaction is below practical limitations. Above 1000° C., cracking of the reactants becomes excessive. Within the above defined temperature range, it has been found that the optimum reaction temperature decreases slightly with the increase in molecular weight of the aliphatic hydrocarbon. In the preferred practice of the process of the present invention, temperatures within the range of 850 to 975° C. are most often used.

The pressure at which the process of the present invention is operated is not particularly critical and may be varied over wide ranges. The pressure may be subatmospheric, atmospheric or superatmospheric. Most often, the pressure at which the process of the present invention is operated is within the range of 5 to 100 p.s.i.a. As a practical matter, the present invention is usually operated at or near atmospheric pressure, i.e., 14.5 to 20 p.s.i.a.

In operating the present process, the residence time of the reactants within the reaction zone most often is within the range of 0.1 to 20 seconds. The optimum residence time will vary according to temperatures, lower residence time being used with higher temperatures and conversely, longer residence time being used with lower temperatures. In the preferred practice of the process of the present invention, a residence time of 1 to 10 seconds is most often employed.

In carrying out the process of the present invention, it is often desirable to carry out the reaction of the acetonitrile and aliphatic hydrocarbon in the presence of a diluent. Such a diluent is inert to the chemical reaction taking place within the reaction zone. Exemplary of materials which may be used as diluents are nitrogen, helium, argon, carbon dioxide and the like. Among the preferred diluents are nitrogen and helium. When a diluent is used, it may be used in practically any concentration. However, as a practical matter, the diluent is most often present in a mol ratio of diluent to combined acetonitrile and aliphatic hydrocarbon within the range of 0.25:1 to 3:1.

What is claimed is:

1. A process for the preparation of acrylonitrile which comprises subjecting acetonitrile and ethane to a temperature within the range of 750 to 1000° C. for a period of 0.1 to 20 seconds in the absence of a catalyst and in the presence of a minor amount of a promoting agent selected from the group consisting of acetone, methyl ethyl ketone, methyl n-propyl ketone, methyl isopropyl ketone, diethyl ketone, hexanone-2, hexanone-3, formaldehyde, acetaldehyde, propionaldehyde, n-butyraldehyde, isobutyraldehyde, n - valeraldehyde, n - caproaldehyde, and combinations thereof.

2. The process of claim 1 wherein the mol ratio of acetonitrile and ethane is within the range of 10:1 to 1:10.

3. The process of claim 1 wherein the pressure is within the range of 5 to 100 p.s.i.a.

4. The process of claim 1 wherein the residence time is within the range of 1 to 10 seconds.

5. The process of claim 1 wherein the promoting agent is employed in an amount of 1 to 25 weight percent of the mixture of acetonitrile and ethane.

6. The process of claim 1 wherein the reactants and promoting agent are subjected to the reaction conditions in the presence of an inert diluent.

7. The process of claim 6 wherein the inert diluent is selected from the group consisting of nitrogen, argon, helium, and carbon dioxide.

References Cited

UNITED STATES PATENTS

| | | | |
|---|---|---|---|
| 2,953,593 | 9/1960 | Fierce et al. | 260—465.9 XR |
| 3,129,241 | 4/1964 | Krebaum | 260—465.3 |

JOSEPH P. BRUST, Primary Examiner

U.S. Cl. X.R.

260—465.3